United States Patent
Yang et al.

(10) Patent No.: US 10,824,608 B2
(45) Date of Patent: Nov. 3, 2020

(54) FEATURE GENERATION AND STORAGE IN A MULTI-TENANT ENVIRONMENT

(71) Applicant: salesforce.com, inc., San Francisco, CA (US)

(72) Inventors: Yan Yang, San Jose, CA (US); Karl Ryszard Skucha, San Francisco, CA (US); Marco Vivero, Burlingame, CA (US); Joshua Sauter, Palo Alto, CA (US); Kit Pang Szeto, Sunnyvale, CA (US); Leah McGuire, Redwood City, CA (US); Matvey Tovbin, San Carlos, CA (US); Jean-Marc Soumet, San Jose, CA (US); Qiong Liu, Santa Clara, CA (US); Vlad Patryshev, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 290 days.

(21) Appl. No.: 15/884,318

(22) Filed: Jan. 30, 2018

(65) Prior Publication Data
US 2019/0147076 A1    May 16, 2019

Related U.S. Application Data

(60) Provisional application No. 62/584,694, filed on Nov. 10, 2017.

(51) Int. Cl.
| | | |
|---|---|---|
| G06F 16/00 | (2019.01) | |
| G06F 16/22 | (2019.01) | |
| G06N 5/02 | (2006.01) | |
| H04L 29/08 | (2006.01) | |
| H04L 12/24 | (2006.01) | |

(52) U.S. Cl.
CPC .......... *G06F 16/2228* (2019.01); *G06N 5/02* (2013.01); *H04L 41/00* (2013.01); *H04L 67/1097* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2013/0151979 A1* | 6/2013 | Snider | G06F 3/0484 715/738 |
| 2014/0278754 A1* | 9/2014 | Cronin | G06F 16/20 705/7.29 |
| 2019/0081852 A1* | 3/2019 | Nazar | H04L 41/0613 |
| 2019/0081871 A1* | 3/2019 | Nazar | H04L 43/0823 |
| 2019/0265971 A1* | 8/2019 | Behzadi | H04L 67/12 |

\* cited by examiner

*Primary Examiner* — Bai D Vu
(74) *Attorney, Agent, or Firm* — Holland & Hart LLP

(57) ABSTRACT

A system may generate a score for a predictive model based on receiving a streaming data flow of events associated with a predictive model for a tenant. The system may receive the streaming data flow and calculate one or more feature values in real time based on the reception. The system may store each of the calculated features to a multi-tenant database server. The system may calculate a score for the predictive model based on the storage and may transmit an indication of the score (e.g., a prediction) based on the calculation. The system may transmit the score to, for example, a computing device.

20 Claims, 11 Drawing Sheets

FEATURE GENERATION AND STORAGE IN A MULTI-TENANT ENVIRONMENT

CROSS REFERENCE

The present Application for Patent claims priority to U.S. Patent Application No. 62/584,694 by Yang et al., entitled "FEATURE GENERATION AND STORAGE IN A MULTI-TENANT ENVIRONMENT," filed Nov. 10, 2017, assigned to the assignee hereof, and expressly incorporated by reference herein.

FIELD OF TECHNOLOGY

The present disclosure relates generally to database systems and data processing, and more specifically to feature generation and storage in a multi-tenant environment.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system to allow for sharing of resources (e.g., storage, computing resources, etc.) between multiple tenants, which may increase the efficiency associated with storing and processing multi-tenant data. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A multi-tenant platform may be configured to support flexibility regarding how different tenants store and manage data on the platform. For example, a multi-tenant platform may support customizable data objects or data fields, along with standard objects and fields. Furthermore, an application running on the multi-tenant platform may support using machine learning models to perform predictive analytics based on the data from a tenant. However, due to the complexity and variability of how the data from multiple tenants may be stored, the platform may be limited to using data of a standard type (e.g., a single object or a single source) for a particular predictive model. Additionally or alternatively, the platform may be limited on how quickly it can formulate predictions due to the computational complexity of manipulating the data from multiple objects (e.g., aggregating or joining objects) prior to applying the predictive model.

DETAILED DESCRIPTION

Figure 1:
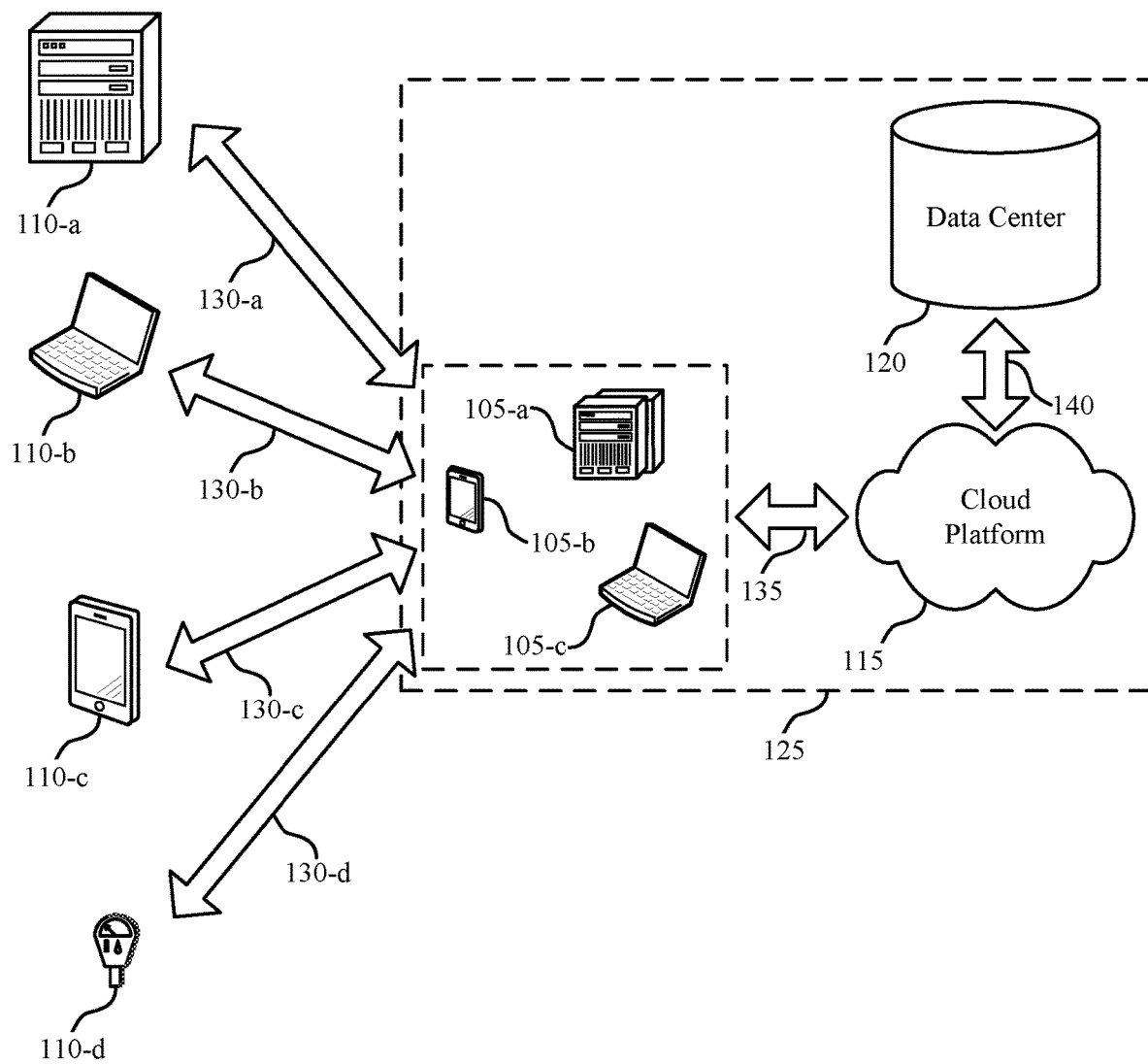
FIG. 1 illustrates an example of a system for data processing at a multi-tenant database server that supports feature generation and storage in a multi-tenant environment in accordance with aspects of the present disclosure.

When an application running on a multi-tenant platform utilizes a machine learning model to perform predictive analytics on data received from a tenant, the data is often analyzed and aggregated in order to produce an accurate predictive model. Because the data received from the tenant often includes multiple objects—including many tenant-specific (e.g., custom) objects—and may be aggregated from multiple sources, generating features based on the data is often complex and time consuming. Due to the complexity of the process, creation of the predictive model is often performed in batch. Meaning that, at a predetermined time interval, the multi-tenant platform may perform predictive analytics on the data to generate features and, ultimately, produce a predictive model or update an existing predictive model. Thus, a system capable of pre-aggregating and storing the data may reduce the complexity of generating a predictive model, and may result in more up-to-date features for use in the predictive model. Ultimately, the stored features may be shared globally (e.g., between tenants), and may be shared between batch (e.g., model creation) and streaming (e.g., data scoring) processes. The described methods of pre-aggregating and storing features between tenants may be favorable as compared to storing features associated with one tenant at one virtual machine (e.g., a node). By implementing the system on a multi-tenant platform (e.g., a multi-tenant database), resources may be shared between tenants and, ultimately, may increase the overall efficiency of the system.

Thus, in accordance with aspects of the present disclosure, by receiving a data flow of events associated with a predictive model for a tenant, a system may be configured to generate one or more features associated with the data, and store the features at a Feature Store (e.g., a database). The features may then be used globally for use in a streaming data scoring processes, ultimately providing tenants with up-to-date features for use in a predictive model.

In a first example, a score for a predictive model may be generated. A multi-tenant database server may receive a data flow of events associated with a predictive model for a tenant. In some examples, the data flow may be received in a streaming workflow and may be referred to as a streaming data flow of events associated with a predictive model for a tenant. In some examples, the streaming data flow of events may include any number of objects—a representation of a type of structured data—received from any number of data sources (e.g., a computing device). Thus the streaming data flow may represent a wide range of data associated with an individual tenant. The multi-tenant database server may calculate one or more feature values from the streaming data flow of events. In some examples, the calculation may be based in part on a feature definition associated with the tenant. The feature definition may, for example, may be related to one or more variables (e.g., specific data points) associated with the streaming data flow, and may be used in calculating a score for the predictive model. In some examples, the multi-tenant database server may then store the one or more feature values at the multi-tenant database server (e.g., a Feature Store, repository, or cache). The stored data may be utilized in calculating a score for the predictive model, which may be based in part on the stored values. In some examples, the multi-tenant database server may subsequently transmit an indication of the calculated scores for the predictive model to, for example, a computing device.

In another example, a score for a predictive model may be generated by receiving a streaming data flow of events associated with a predictive model for a tenant. In some examples, the streaming data flow of events may be buffered (e.g., queued) prior to any calculation, reception, or storage of the data. The multi-tenant database server may calculate one or more feature values based on receiving the streaming data flow of events. In some examples, the calculation of the one or more features values may be based in part on a feature definition associated with the tenant. In other examples, the multi-tenant database server may receive an indication of the feature definition, and the calculation of the one or more feature values may be based in part on receiving the indication of the feature definition. Additionally or alternatively, for example, the multi-tenant database server may then store the one or more feature values at the multi-tenant database server. Subsequently, for example, the one or more feature values stored at the multi-tenant database server may be retrieved, for example by a component or a module of the multi-tenant database server. The multi-tenant database server may then calculate a score for the predictive model and the calculation of the score may be based in part on retrieving the stored feature values. In other examples, the multi-tenant database server may transmit an indication of the calculated scores for the predictive model to, for example, a computing device.

Aspects of the disclosure are initially described in the context of an environment supporting an on-demand database service. Further aspects of the disclosure are described with respect to systems that support feature generation and storage in a multi-tenant environment, such as at a multi-tenant database server. Aspects of the disclosure are further-illustrated by and described with reference to apparatus diagrams, system diagrams, and flowcharts that relate to feature generation and storage in a multi-tenant environment.

FIG. 1 illustrates an example of a system 100 for cloud computing that supports feature generation and storage in a multi-tenant environment in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud clients 105 of subsystem 125 may be examples of one or more computing devices and data center 120 may be an example of or include, as a component, a multi-tenant database server to which a cloud client 105 may connect. A multi-tenant database server may be configured to share resources (e.g., storage or computational resources) across a plurality of tenants. Data from the different tenants may be stored in shared tables and may be identified by a key or similar tenant-specific identifier.

In accordance with aspects of the present disclosure, the data center 120 may be configured to calculate scores for predictive models (e.g., machine learning or artificial intelligence models) for several tenants using shared resources (e.g., using a multi-tenant database server). The data center 120 may receive a data flow associated with a tenant (e.g., a user of cloud client 105) as a streaming data flow (e.g., a real-time data flow) or as a batch data flow. The incoming data may include communication data (e.g., emails, calendar invites, chat messages, text messages, etc.) or data resulting from an analysis of communication data (e.g., activities or events associated with communication data). Other forms of incoming data or metadata may also be used as an input for a predictive model. Furthermore, the incoming data may come from multiple sources (e.g., multiple objects).

For example, data center 120 may receive a streaming data flow of events associated with a predictive model for a tenant. The streaming data flow of events may be associated with, for example, specific user input received via cloud client 105. In some examples, data center 120 may calculate one or more feature values in a streaming workflow from the streaming data flow of events. In some examples, the calculation may be based at least in part on a feature definition associated with the tenant. The data center 120 may then, in some examples, store the one or more feature values. The feature values may be stored at the data center 120 or, in some examples, may be stored at an auxiliary server in communication with data center 120. The data center 120 may calculate and store feature values for multiple tenants using shared resources of the data center 120.

Upon storing the feature values, the data center 120 may calculate scores for the predictive model based in part on the stored feature values. In some examples, the data center 120 calculates scores for multiple tenants using shared resources (e.g., on a same server, such as a multi-tenant database server). The data center 120 may use a tenant identifier to determine the corresponding tenant for a set of data, the corresponding feature definitions to use for that tenant, and the corresponding model to use for that tenant. The data center 120 may transmit an indication of the calculated scores to cloud client 105. As described in more detail below, the calculation of the scores for the predictive model by data center 120 may be facilitated by a user interface at a cloud client 105.

Figure 2:
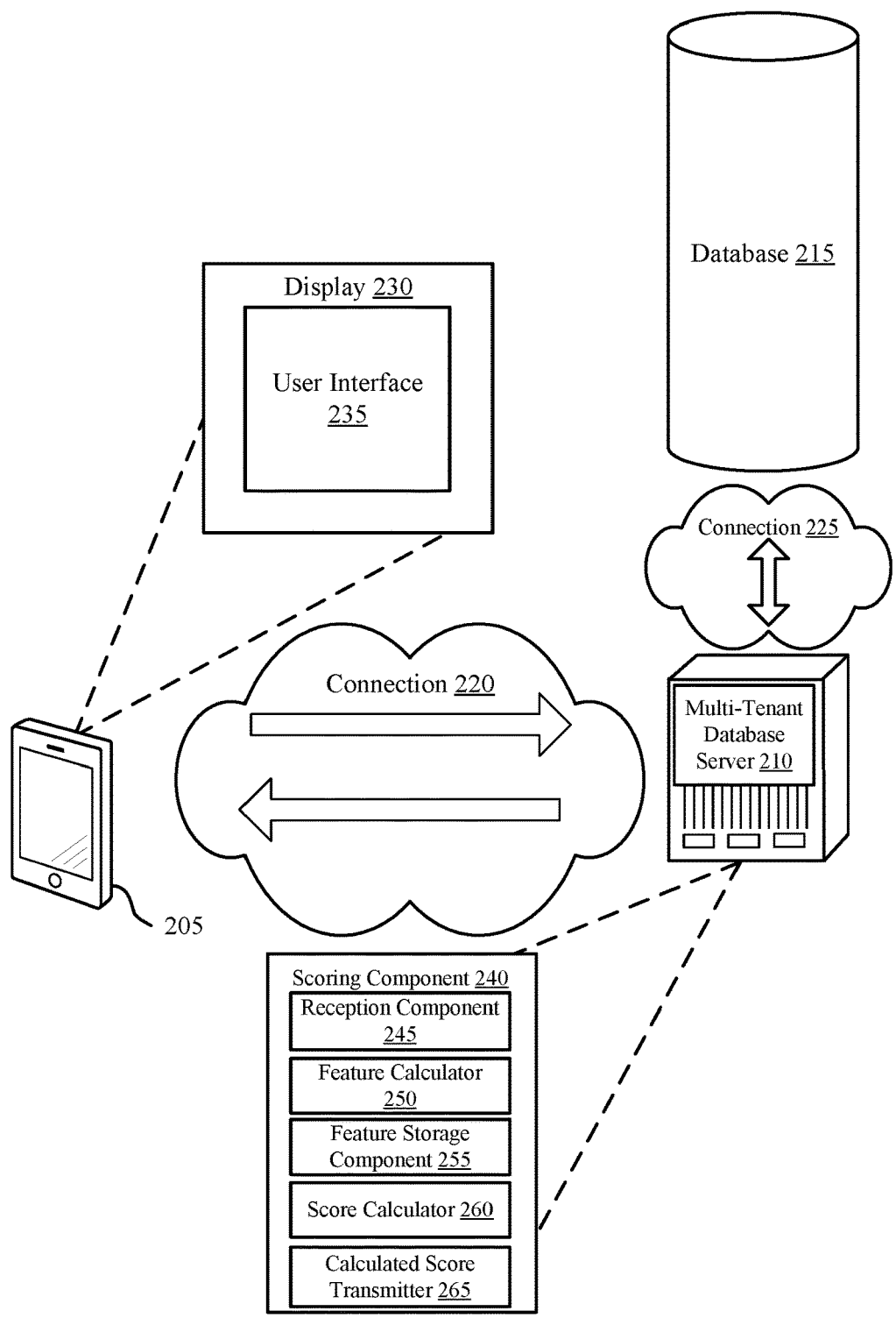
FIGS. 2 through 4 illustrate examples of a database system that support feature generation and storage in a multi-tenant environment in accordance with aspects of the present disclosure.

FIG. 2 illustrates an example of a system 200 that supports feature generation and storage in a multi-tenant environment in accordance with various aspects of the present disclosure. The system 200 may include a computing device 205, which may be an example of a cloud client 105 as described with reference to FIG. 1; a multi-tenant database server 210, which may be an example of the data center 120 as described with reference to FIG. 1; and a database 215. In some cases, the multi-tenant database server 210 may be an example of components of a data center 120, a cloud platform 115, or some combination of these, as described with reference to FIG. 1. The system 200 may also include one or more connections, such as connection 220 and connection 225. In some examples, the computing device 205 may include display 230 and user interface 235. The multi-tenant database server 210 may include scoring component 240, which may include a plurality of modules— reception component 245, feature calculator 250, feature storage component 255, score calculator 260, and calculated score transmitter 265. In some examples, the multi-tenant database server 210 may be an example of or include a predictive model platform.

In some examples, the computing device 205 may display a user interface 235 via a display 230. The user interface 235 may contain one or more fields to receive user input. For example, the fields may receive user input that includes a prediction name, a prediction type, an Application Program Interface (API) name, an object prediction, or a field prediction, among others. In some examples, the fields may be associated with receiving a score for the predictive model associated with the user of computing device 205. Additionally or alternatively, for example, populate any one of the input fields to receive a score for the predictive model or, in some examples, may indicate a selection (e.g., a check box) of a desired prediction to receive a score for the predictive model. In other examples, the user may select one or more objects or fields to predict from, for example, a populated list of objects or fields.

Upon receiving the user input, multi-tenant database server 210 may receive a data flow of events associated with a predictive model for a tenant. In some examples, the data flow of events may be received in a streaming (e.g., real-time) manner and may be referred to as a streaming data flow or a streaming data flow of events associated with a predictive model for a tenant. In some examples, the streaming data flow may include a plurality of objects received from a plurality of data sources. Stated alternatively, the multi-tenant database server 210 may receive a plurality of data from a plurality of tenants (e.g., tenants of a multi-tenant organization or platform). The data may be received from a plurality of data sources or objects. Each object received may be a representation of a type of structured data (e.g., a table of data). In some examples, the data may be stored as Avro files. The data flow from different tenants may be identified by a tenant identification (ID) or some other identifying indication corresponding to the particular tenant.

The multi-tenant database server 210 may receive the data flow, for example, at reception component 245. The data flow received by multi-tenant database server 210 may be structured as one or more objects. For example, the data flow, or the one or more objects contained in the data flow, may be a representation of a type of structured data as described above. In some examples, the multi-tenant database server 210 may receive one or more objects associated with a tenant or a plurality of tenants and may receive the data flow from computing device 205 via connection 220. The received data flow may be associated with a predictive model for each tenant of a plurality of tenants of a multi-tenant organization. In any example, the reception of the data flow may be facilitated by the user interface 235.

Upon receiving the data flow, multi-tenant database server 210 may calculate one or more feature values. In some examples, the multi-tenant database server 210 may calculate the one or more feature values from the data flow of events. The feature calculation may be in streaming workflow (e.g., in real time), meaning that the calculation may occur continually based on the streaming reception of the data flow of events. The calculation may occur in a streaming manner if the data flow is being received from one tenant, or if the data flow is being received from a plurality of tenants.

The multi-tenant database server 210 may calculate the one or more features based at least in part on a feature definition associated with the tenant. In other examples, the feature definition may be associated with one or more of a plurality of tenants of a multi-tenant organization. In some examples, the calculation of the one or more feature values may be conducted by feature calculator 250 of the multi-tenant database server 210.

In some examples, the calculation of one or more feature values may be based in part on metadata associated with the streaming data flow of events. The metadata may include a characteristic of the data flow and a data type. For example, the type of a data may be a string and the characteristic of the data may be that the string is an email address. As another example, the data type of the data may be a number of integer and the characteristic of the data may be that the number is a phone number. The metadata may be stored on and received by the multi-tenant database server 210, for example, from database 215 via connection 225. The metadata stored in database 215 may be available because the data may be stored in a CRM application that analyzes and understands these characteristics of the data.

The multi-tenant database server 210 may, in some examples, store the one or more feature values at the multi-tenant database server 210 after calculating the one or more feature values. In some examples, the calculated one or more feature values may be stored to the multi-tenant database server 210 as described above and, in other examples, the calculated one or more feature values may be stored to an auxiliary database server, such as database 215. The calculated one or more feature values may be stored at database 215 via connection 225. In either example, the calculation and storage of the feature values may occur in a streaming workflow. That is, the multi-tenant database server 210 may calculate and store the features values as the data streams into the system (e.g., pre-aggregate the feature values), rather than calculating the feature values synchronously with scoring the data.

Additionally or alternatively, for example, storing the one or more feature values may be conducted by feature storage component 255 of the multi-tenant database server 210. The feature storage component 255 may store the feature values of a plurality of tenants. In some examples, storing the one or more feature values may include assigning a key to the one or more feature values. The key assignment may be, for example, based in part on an identification of the tenant, an entity type of the tenant, an entity identification of the tenant, an identification of the feature definition associated with the tenant. In other examples, the key assignment may be based on another, unnamed characteristic associated with the tenant or the data, or may be based in part on a combination of the identifiers discussed above. They key may be assigned, for example, to specify where or in what manner the streaming data flow is stored, and may be or may contain a partition key and/or a clustering key. Either type of key may include or be related to the above-discussed identifiers. Additionally or alternatively, for example, the key may be assigned by feature storage component 255 of the multi-tenant database server 210.

Upon storing the one or more feature values at, for example, multi-tenant database server 210, the multi-tenant database server may calculate scores for the predictive model based at least in part on the stored one or more feature values. The calculation may occur, for example, at score calculator 260. In some examples, the calculation of the score for the predictive model may be time-based or rule-based.

In a time-based scenario, the calculation of the score for the predictive model may be based the occurrence of a predetermined time interval. Stated alternatively, in a time-based scenario, the multi-tenant database server 210 may calculate the score after a predetermined amount of time has passed. The predetermined amount of time may correspond to a time period after receiving the streaming data flow, a time period after calculating the one or more feature values, a time period after storing the one or more feature values, or a combination thereof.

In a rule-based scenario, for example, the multi-tenant database server 210 may calculate the score for the predictive model based on one or more rules associated with the feature definition associated with the tenant. The one or more rules may be or may pertain to, for example, a determination that a change in the one or more feature values stored at the multi-tenant database server 210 has exceeded a threshold value. Stated alternatively, the calculation of the score for the predictive model may occur after determining that a feature value, stored at the multi-tenant database server, has changed by a predetermined amount. This change may occur, for example, due to the storage of updated data pertaining to a same or similar feature value.

In some examples, prior to calculating the score for the predictive model, the multi-tenant database server 210 may retrieve the stored one or more feature values. The multi-tenant database server 210 may retrieve the stored feature values from, for example, the multi-tenant database server 210 or from the database 215 via connection 225. The multi-tenant database server 210 may retrieve the stored feature values for a particular tenant based on an a key or ID associated with the tenant. The retrieval of the stored feature values may be based in part on a change in a number of feature values stored at the multi-tenant database server 210. Stated alternatively, the addition of feature values to multi-tenant database server 210 (e.g., from additional tenants) may result in the retrieval of one or more feature values. In any example, the calculation of the scores for the predictive model may be based in part on retrieving the stored feature values. In some examples, the retrieval of the feature values may be conducted in a streaming workflow, for example concurrent with receiving an indication to calculate a score for the predictive model for the tenant.

The multi-tenant database server 210 may compute (e.g., calculate) one or more scores for the predictive model. For example, the multi-tenant database server 210 may continually calculate scores based on receiving a streaming data flow of events. In some examples, the multi-tenant database server 210 may automatically update a predictive learning model based in part on calculating a score for the model. For example, the multi-tenant database server 210 may update the model for use in calculating an additional score. The multi-tenant database server 210 may include any number of machine learning algorithms used in predictive model building to score the calculations and to update the predictive model based on the scores.

Upon calculating the score for the predictive model, the multi-tenant database server 210 may transmit an indication of the calculated score for the predictive model to computing device 205. In some examples, the transmission may occur via connection 220. In other examples, the transmission may be conducted by calculated score transmitter 265 of the multi-tenant database server 210. The transmission may occur, for example, based in part on the calculation of the one or more scores for the predictive model. In some examples, the score may be transmitted according to the time-based or rule-based examples, discussed above. Thus the score may be transmitted after a predetermined time or upon the occurrence of a predetermined rule or rules.

In other examples, the multi-tenant database server 210 may receive a new or additional streaming data flow of events. In such an example, the multi-tenant database server 210 may calculate one or more feature values based on the new or additional streaming data flow, store the one or more feature values at, for example, the multi-tenant database server 210, and calculate one or more scores for the predictive model. Additionally or alternatively, for example, the multi-tenant database server may transmit, to the computing device 205, an updated indication of the calculated score for the predictive model based on receiving the new or additional streaming data flow of events. In another example, the transmission of the updated score may be based in part on receiving a new or additional streaming data flow of events from any number of tenants of a multi-tenant organization.

In another example, a method for data processing at a multi-tenant database server for a second tenant may be described. For example, the multi-tenant database server 210 may receive a streaming data flow of events associated with a predictive model for a second tenant. Upon receiving the data flow of events, the multi-tenant database server 210 may calculate one or more feature values in real time from the streaming data flow of events based at least in part on a feature definition associated with the second tenant. Additionally or alternatively, for example, the multi-tenant database server 210 may store the one or more feature values associated with the second tenant at the multi-tenant database server 210. Upon storing the one or more feature values associated with the second tenant, the multi-tenant database server may calculate scores for the predictive model based at least in part on the stored one or more feature values associated with the second tenant. In other examples, the stored one or more feature values may be shared across multiple tenants (e.g., of a multi-tenant organization). That is, the features may be decoupled from a particular predictive model and may be shared with other tenants or other models. The multi-tenant database server 210 may then transmit an indication of the calculated scores for the predictive model associated with the second tenant to a second computing device (e.g., an additional computing device; not shown).

Figure 3:
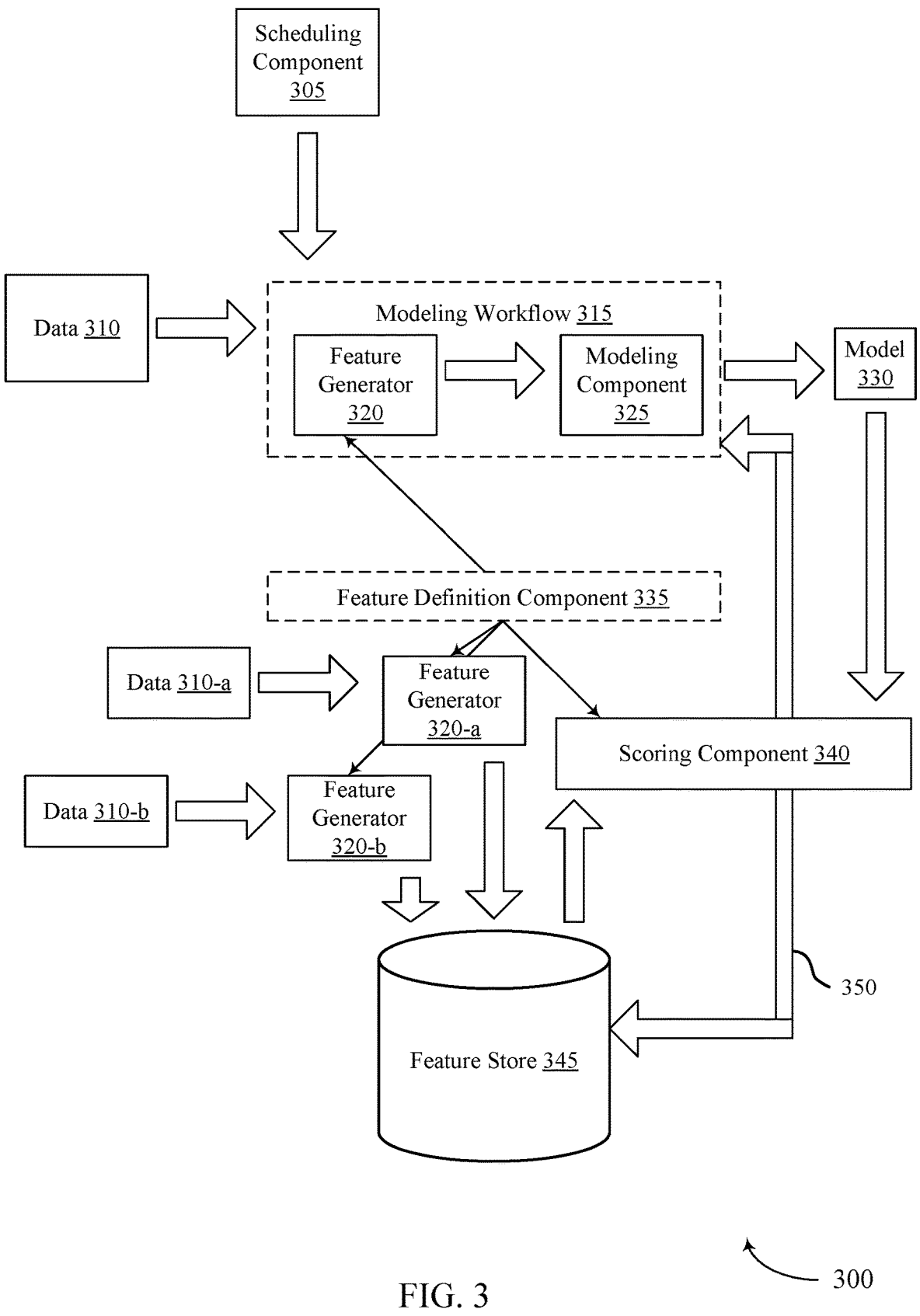

FIG. 3 illustrates an example of a system 300 that supports feature generation and storage in a multi-tenant environment in accordance with various aspects of the present disclosure. The system 300 may include data 310, 310-*a*, and 310-*b*, which may be examples of a data flow of events as described with reference to FIG. 2; and feature store 345, which may be an example of a multi-tenant database server 210 as described with reference to FIG. 2. The system 300 may also include scheduling component 305 and a modeling workflow component 315, which may include feature generator component 320 and modeling component 325. The system 300 may also include model file 330, feature definition component 335, and scoring component 340. The system 300 may also include feature generator components 320-*a* and 320-*b*, connection sync 350, and may also include additional data and feature generator components that are not shown.

The system 300 may support a modeling workflow, which in general includes generating or updating a model for use in subsequent data scoring procedures. For example, data 310 may be received at modeling workflow component 315. The data may be received, for example, based on scheduling component 305. For example, scheduling component 305 may transmit a signal to modeling workflow component 315 to indicate that data has been transmitted from a tenant. In other examples, the scheduling component 305 may transmit a signal to a computing device (e.g., computing device 205 as described with reference to FIG. 2) to initiate the transfer of data 310 to modeling workflow component 315. Upon receiving the data 310 at modeling workflow component 315, the feature generator component 320 may generate (e.g., calculate) one or more feature values. In some examples, the one or more feature values may be calculated based in part on a feature definition associated with a tenant or associated with one or more tenants of a multi-tenant organization. The feature definitions may be stored and retrieved from feature definition component 335. As described above with reference to FIG. 2, the feature values may be based in part on metadata associated with data 310 and the feature definition may indicate one or more variables of data 310 used in a predictive model.

Upon generating one or more feature values via feature generator component 320, the one or more feature values may be transmitted to modeling component 325. Modeling component 325 may, for example, generate a model based on the one or more feature values, or in some examples, modeling component 325 may incorporate the one or more feature values into an existing model. In either example, the result of modeling component 325 may be model file 330, which may be subsequently used in calculating scores for a predictive model. The model file 330 may be a representation of a predictive model. The processes described above with reference to modeling workflow component 315 may, in some examples, be conducted in batch, for example scheduled by scheduling component 305. Meaning that the data 310 may be received and a model may be ultimately generated or updated after a predetermined amount of time. For example, the modeling workflow component 315 process may occur hourly, daily, or monthly.

As described above, the feature generator component 320 may generate one or more feature values based in part on a feature definition associated with the tenant. In some examples, the feature definition may be or may be or may indicate one or more variables of data 310 used in a predictive model. In some examples, the feature definition component 335 may indicate one or more feature definitions for use in a predictive model. For example, feature definition component 335 may indicate to, for example, feature generator component 320 one or more feature definitions. The feature definitions may be pre-defined by a user as part of a predictive modeling workflow.

In addition to the modeling workflow described above, the system 300 may support a scoring workflow that generally uses the model stored in model file 330 to score incoming data. The result of the scoring workflow is in general one or more predictive scores that are transmitted back to a user. The scoring workflow may be performed in a batch manner (e.g., every hour). For example, after generating model file 330, the system may receive or retrieve data from one or more tenants (e.g., of a multi-tenant organization). Data 310-*a* and 310-*b*, for example, may represent data received from a first computing device associated with a first tenant and a second computing device associated with a second tenant, respectively. First and second computing devices may be examples of computing device 205 as described with reference to FIG. 2. In some examples, data 310-*a* and 310-*b* may be examples of a data flow of events associated with a predictive model for a tenant. In other examples, a plurality of data may be received from a plurality of tenants of a multi-tenant organization.

Upon receiving data 310-*a* and 310-*b*, the system 300 may calculate one or more feature values. In some examples, the system 300 may calculate one or more feature values, for each of data 310-*a* and 310-*b*, at feature generator component 320-*a* and feature generator component 320-*b*. Because each of the one or more feature values may be based in part on a feature definition associated with each respective tenant, each of feature generator component 320-*a* and feature generator component 320-*b* may utilize feature definition component 335 in calculating the one or more feature values. The features definitions for each tenant may be retrieved from the feature definition component 335 based on an ID or key associated with a particular tenant. Thus, for example, feature definition component 335 may provide to feature generator component 320-*a* and 320-*b*, respectively, an indication one or more feature definitions to use in calculating scores for a predictive model.

In some examples, after calculating the one or more feature values for each of data 310-*a* and data 310-*b*, the respective feature values may be stored in feature store 345. In other examples, one or more features generated by feature generator component 320 may be stored in feature store 345 via connection sync 350. The storage may be an example of storing the one or more feature values at the multi-tenant database server as described with reference to FIG. 2. In some examples, storing the feature values may be an example of keeping the feature values updated in the feature store 345. Calculating and storing the feature values in the feature store 345 may be an example of pre-aggregating the features values for later use in scoring. As described above, pre-aggregating the feature values and later retrieving them from the feature store 345 may be computationally less expensive (e.g., use less resources) than deriving the features directly from the data and then using them synchronously for scoring.

The one or more feature values stored at the feature store 345 may, in some examples, be retrieved by scoring component 340 for use in calculating scores for a predictive model. Upon receiving the feature values associated with data 310-*a* and 310-*b*, respectively, the scoring component 340 may calculate scores for the predictive model based at least in part on the stored one or more feature values. Thus, in the previous example, the scoring component 340 may calculate a score for a predictive model based on the reception of data 310-*a*, and may calculate an additional score for a predictive model based on the reception of data 310-*b*. In some examples, scoring component 340 may utilize or may incorporate the model file 330 into the calculation of the scores for the predictive model. Thus data 310 received by modeling workflow component 315 may assist in the ultimate calculation of one or more scores for the predictive model.

In some examples, each of the calculated scores discussed above may then be transmitted to, for example, a respective computing device (e.g., computing device 205 as described with reference to FIG. 2; not illustrated). This transmission may be an example of transmitting an indication of the calculated scores for the predictive model to a computing device as described above.

Figure 4:
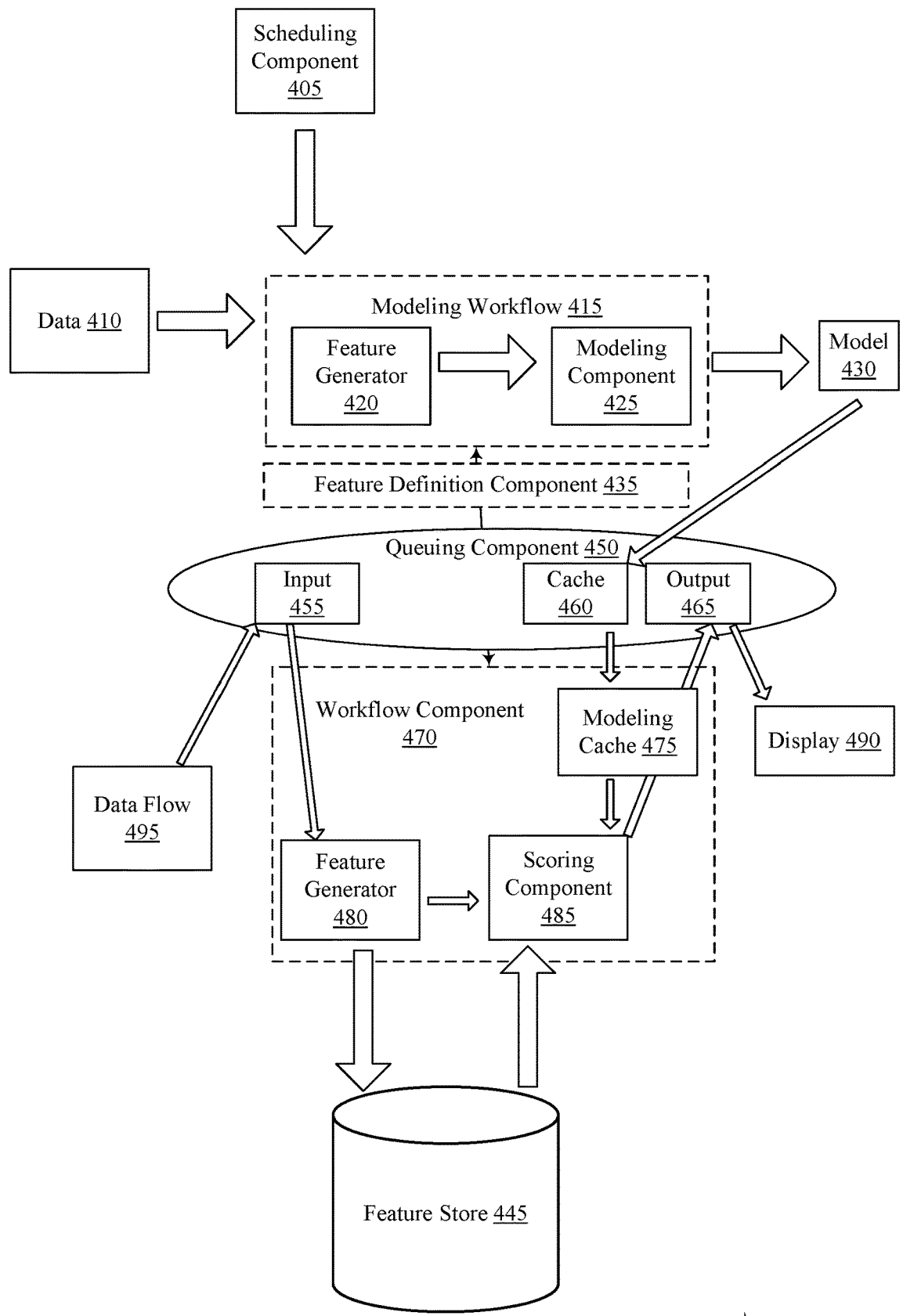

FIG. 4 illustrates an example of a system 400 that supports feature generation and storage in a multi-tenant environment in accordance with various aspects of the present disclosure. The system 300 may include scheduling component 405, which may be an example of scheduling component 305 as described with reference to FIG. 3; data 410, which may be an example of data 310 as described with reference to FIG. 3; modeling workflow component 415, feature generator component 420, and modeling component 425, which may be examples of modeling workflow component 315, feature generator component 320, and modeling component 325, respectively, as described with reference to FIG. 3; model file 430, which may be an example of model file 330 as described with reference to FIG. 3; feature definition component 435, which may be an example of feature definition component 335 as described with reference to FIG. 3; and feature store 445, which may be an example of feature store 345 as described with reference to FIG. 3.

System 400 may include queueing component 450, which may include input 455, cache 460, and output 465. In some examples, system 400 may include workflow component 470, which may include modeling cache 475, and feature generator 480 and scoring component 485, which may be examples of feature generator component 320-*a* and scoring component 340, respectively, as described with reference to FIG. 3. In some examples, system 400 may also include display component 490 and data flow 495. The system 400 may also include data flows 495 from additional tenants of a multi-tenant organization, that are not shown.

The modeling workflow 415 may operate in a similar manner as the modeling workflow component 315 described with reference to FIG. 3. This is, the modeling workflow 415 may generate or update predictive models based on data 410, which may be later used to score data in predictive analysis. Data 410 may be received at modeling workflow component 415. The data may be received, for example, based on scheduling component 405. For example, scheduling component 405 may transmit a signal to modeling workflow component 315 to indicate that data has been transmitted from a tenant. In other examples, the scheduling component 405 may transmit a signal to a computing device (e.g., computing device 205 as described with reference to FIG. 2) to initiate the transfer of data 410 to modeling workflow component 415. In some examples, the data 410 may include Avro files. Upon receiving the data 410 at modeling workflow component 415, the feature generator component 420 may generate (e.g., calculate) one or more feature values. In some examples, the one or more feature values may be calculated based in part on a feature definition associated with a tenant or associated with one or more tenants of a multi-tenant organization. As described above with reference to FIG. 2, the feature values may be based in part on metadata associated with data 410 and the feature definition may indicate one or more variables of data 410 used in a predictive model.

Upon generating one or more feature values via feature generator component 420, the one or more feature values may be transmitted to modeling component 425. Modeling component 425 may, for example, generate or update a model based on the one or more feature values, or in some examples, modeling component 425 may incorporate the one or more feature values into an existing model. In either example, the result of modeling component 425 may be model 430, which may be subsequently used in calculating scores for a predictive model. The model 430 may be a representation or a file containing the predictive model. The processes described above with reference to modeling workflow component 415 may, in some examples, be conducted in batch and scheduled by, for example, scheduling component 405. Meaning that the data 410 may be received and a model may be ultimately generated or updated after a predetermined amount of time. For example, the modeling workflow component 415 process may occur hourly. In other examples, the modeling workflow process may occur in streaming.

As described above, the feature generator component 420 may generate one or more feature values based in part on a feature definition associated with the tenant. In some examples, the feature definition may be or may be or may indicate one or more variables of data 410 used in a predictive model. In some examples, the feature definition component 435 may indicate one or more feature definitions for use in a predictive model. For example, feature definition component 435 may indicate to, for example, feature generator component 420 one or more feature definitions. This indication may aid the modeling workflow component 415 in generating or updating model file 430. In other examples, feature definition component 435 may determine features common to specific groups of data. For example, feature definition component 435 may determine one or more features common to data associated with client leads. Feature definition component 435 may then generate one particular feature associated with all client leads that may be used in a predictive model.

In some examples, the model file 430 may be transmitted to queueing component 450. In some examples, the model file 430 may be stored at cache 460 of the queueing component 450. At cache 460, for example, the model 430 may be buffered prior to transmission of the model to workflow component 470. Buffering the model file 430 at cache 460 may, for example, facilitating score calculation for a predictive model of a plurality of tenants (e.g., a multi-tenant organization). In other examples, one or more generated features may be cached (e.g., at cache 460). The features may be cached by tenant, specifically by a tenant identification. The cached tenant-specific features may then be shared across multiple tenants (e.g., of a multi-tenant organization), which may aid in calculating one or more scores, for a particular tenant, associated with a predictive model. Stated another way, cached tenant-specific features may be used (e.g., by one or more tenants of a multi-tenant organization) to calculate scores for a predictive model. The features may be shared, for example, by using a distributed hash table (DHT), or by one or more storage or compute nodes. System 400 may also support a scoring workflow, which in general includes receiving data for one or more tenants, generating features from the data, applying the features in a predictive model (e.g., a model from model file 430), scoring the data, and transmitting the scores back to a tenant or customer. System 400 may include certain components and workflows that support performing some or all of these steps in a streaming manner, which may reduce the latency experienced by a customer requesting a predictive result from predictive model. The scoring workflow may also support multiple tenants (e.g., using a multi-tenant database server). That is, the system 400 may support the feature generation and scoring of thousands (or even millions) of models for multiple tenants in a streaming manner.

As part of the scoring workflow, a data flow 495 may be received at input 455. In some examples, the data flow 495 may be received in streaming manner (e.g., real time) and may be referred to as a streaming data flow or a streaming data flow of events associated with a predictive model for a tenant. Streaming data flow 495 may be an example of a streaming data flow of events associated with a predictive model for a tenant as described above with reference to FIG. 2. The data flow 495 may include multiple objects or data sources for a particular tenant. For example, the streaming data flow 495 may be received at input 455 from a computing device (e.g., computing device 205*a* described above with reference to FIG. 2) associated with one or more tenants of a multi-tenant organization.

The data flow 495 may be buffered at input 455 in the queuing component 450. The input 455 may then be transmitted to feature generator 480. Similarly, the stored model file 430 in cache 460 may be transmitted to modeling cache 475 within the streaming workflow component 470.

Once the data is received at the feature generator 480, the feature generator 480 may calculate one or more feature values in a streaming workflow. As part of this process, the feature generator 480 may identify the tenant associated with the data, and retrieve the corresponding feature definitions (e.g., from feature definition component 435). The feature generator 480 may calculate one or more feature values from the streaming data flow 495 based at least in part on a feature definition associated with the tenant. As described above, feature definition component 435 may facilitate the generation of one or more feature values by providing, or by providing an indication of, one or more feature definitions to feature generator 480.

The calculated one or more feature values may be stored at the feature store 445. This storage may be an example of storing the one or more feature values at the multi-tenant database server as described above with reference to FIGS. 2 and 3. Storing the feature values at feature store 445 may be an example of pre-aggregating the feature values. Furthermore, storing the feature values may be characterized as updating a feature value that is already stored in the feature store 445. Storing the feature values in a feature store 445 for later use may facilitate fast joins and aggregations of different objects, for example to support multiple sources in combination with a streaming workflow. Calculating the feature values may be performed in a streaming workflow, for example as the data streams in (e.g., in real time). As described above, because the feature store 445 may be a component of or include a multi-tenant data base server, the feature values may be stored and keyed with a tenant ID so that the feature values for a plurality of tenants may be stored on the shared resources of the multi-tenant database.

In some examples, the feature definition component 435 or the feature store 445 may abstract a computational rule from a certain type of object record to a feature that is usable in various stages of machine learning. Such an abstraction may be characterized as a common feature definition that is usable across different types of workflows (e.g., streaming and batch), across different applications, across different stages of the machine learning process, across different tenants, or some combinations of these factors. For example, such abstractions may allow the accurate and reproducible sharing of features in all stages of machine learning, from modeling to scoring. Such abstractions may also facilitate an efficient method of managing all the features derived from common objects across different applications. Leveraging a common feature definition across many tenants may save computational resources (e.g., computation time and memory) as compared to using feature definitions that are not applicable to several tenants or applications.

In some examples, after storing the one or more feature values, the one or more feature values may be received by scoring component 485. In other examples, the one or more stored feature values may be automatically transmitted to scoring component 485 based on a request for a score for a predictive model by a tenant. Scoring may be performed based on one or more scoring heuristics. That is, instead of scoring the data each time a feature changes in the feature store 445, the scoring procedure may be independent from the feature generation. The scoring may be time based or rule based. For example, in the case of rule based scoring, scoring may occur based on a threshold of how much a feature has changed (e.g., a percentage change in a feature), or a threshold based on a weight of the feature in a predictive model and the percentage change or impact of the feature on the predictive model.

Scoring component 485, upon receiving the one or more feature values from the feature store 445, may calculate one or more scores for the predictive model based at least in part on the stored one or more feature values. The scoring component 485 may retrieve the feature values from the feature store 445 for all the features relevant for a particular model. As described above, because the feature values for all the defined features have been pre-computed and aggregated at the feature store 445, the computational resources for retrieving the latest feature value and inputting them into the model may be less (e.g., quicker and less computationally expensive) than if the features had to be calculated as the data was being scored. That is, because the feature values are being pre-aggregated, the system 400 may support multiple objects or sources of data, which otherwise may have been prohibitively expensive if the features were being calculated as the data was being scored (e.g., if the features were being generated synchronously with the scoring). In some examples, features relevant for a particular model may be or may include tenant identifiers (e.g., email addresses), a client lead, a single revenue associated with a lead. In other examples, features relevant for a particular model may be or may include aggregate values, such as an amount of opportunities associated with a particular lead or revenue associated with a lead over a period of time.

In some examples, scoring component 485 may receive the model from model file 430, or an indication of the model file 430, for use in calculating the scores for the predictive model. For example, the scoring component 485 may retrieve the corresponding model for a particular tenant (e.g., of a plurality of models of a plurality of tenants) based on an ID or key of the tenant.

Upon calculating the scores, the scoring component 485 may transmit the scores, or an indication of the scores, to output 465. In some examples, the output 465 may transmit the scores, or an indication of the scores to display component 490. This transmission may be an example of transmitting an indication of the calculated scores for the predictive model to a computing device (e.g., computing device 205) as described above with reference to FIG. 2.

Figure 5:
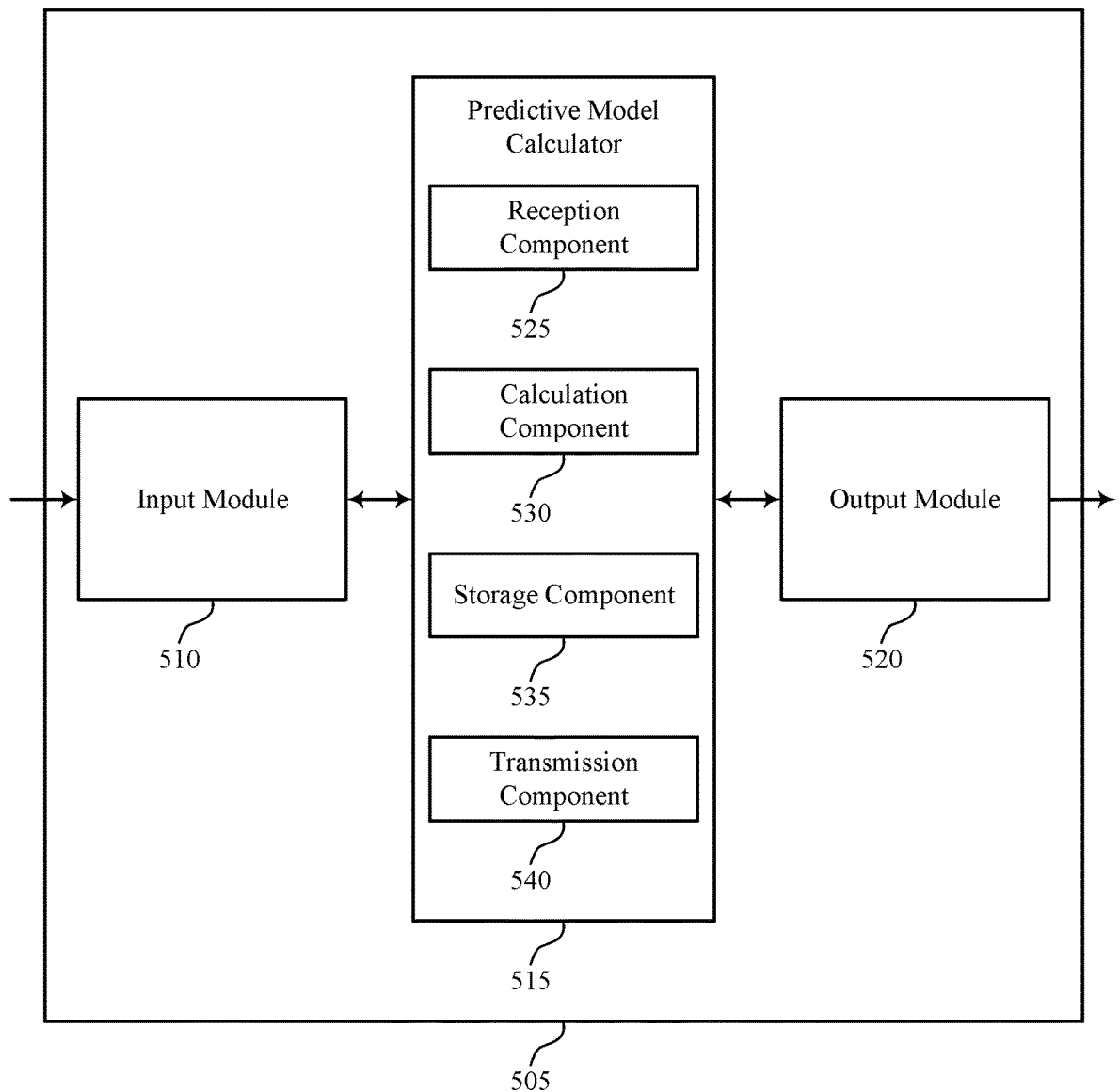
FIGS. 5 through 6 show block diagrams of a device that supports feature generation and storage in a multi-tenant environment in accordance with aspects of the present disclosure.

FIG. 5 shows a block diagram 500 of an apparatus 505 that supports feature generation and storage in a multi-tenant environment in accordance with aspects of the present disclosure. Apparatus 505 may include input module 510, predictive model calculator 515, and output module 520. Apparatus 505 may also include a processor. Each of these components may be in communication with one another (e.g., via one or more buses). In some cases, apparatus 505 may be an example of a user terminal, a database server, or a system containing multiple computing devices.

Predictive model calculator 515 may be an example of aspects of the predictive model calculator 715 described with reference to FIG. 7.

Predictive model calculator 515 and/or at least some of its various sub-components may be implemented in hardware, software executed by a processor, firmware, or any combination thereof. If implemented in software executed by a processor, the functions of the predictive model calculator 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The predictive model calculator 515 and/or at least some of its various sub-components may be physically located at various positions, including being distributed such that portions of functions are implemented at different physical locations by one or more physical devices. In some examples, predictive model calculator 515 and/or at least some of its various sub-components may be a separate and distinct component in accordance with various aspects of the present disclosure. In other examples, predictive model calculator 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Predictive model calculator 515 may also include reception component 525, calculation component 530, storage component 535, and transmission component 540.

Reception component 525 may receive a data flow of events associated with a predictive model for a tenant, receive a data flow of events associated with a predictive model for a second tenant at the multi-tenant database server, and receive an indication of the feature definition. In some examples, calculating the one or more feature values may be based on the indication of the feature definition. In some cases, the data flow of events associated with the predictive model includes a streaming data flow. In some cases, the received data flow may be associated with a predictive model for each tenant of a set of tenants of a multi-tenant organization.

Calculation component 530 may calculate one or more feature values from the data flow of events based on a feature definition associated with the tenant, calculate scores for the predictive model based on the stored one or more feature values, calculate the one or more feature values from the data flow in a streaming workflow, calculate one or more feature values from the data flow of events based on a feature definition associated with the second tenant, calculate scores for the predictive model for the second tenant based on the stored one or more feature values associated with the second tenant, calculate the scores for the predictive model based on a predetermined time interval, and calculate the scores for the predictive model based on one or more rules associated with the feature definition associated with the tenant. In some cases, the feature definition is associated with a set of tenants of the multi-tenant organization.

Storage component 535 may store the one or more feature values at the multi-tenant database server, store the one or more feature values associated with the second tenant at the multi-tenant database server, and store the one or more feature values at the multi-tenant database server. In some examples, calculating the scores for the predictive model are performed in a streaming workflow and are based on receiving the data flow of events associated with the predictive model for the tenant. In some cases, storing the one or more feature values at the multi-tenant database server may include assigning a key to the one or more feature values based on an identification of the tenant, an entity type of the tenant, an entity identification of the tenant, an identification of the feature definition associated with the tenant, or a combination thereof.

Transmission component 540 may transmit an indication of the calculated scores for the predictive model to a computing device.

Figure 6:
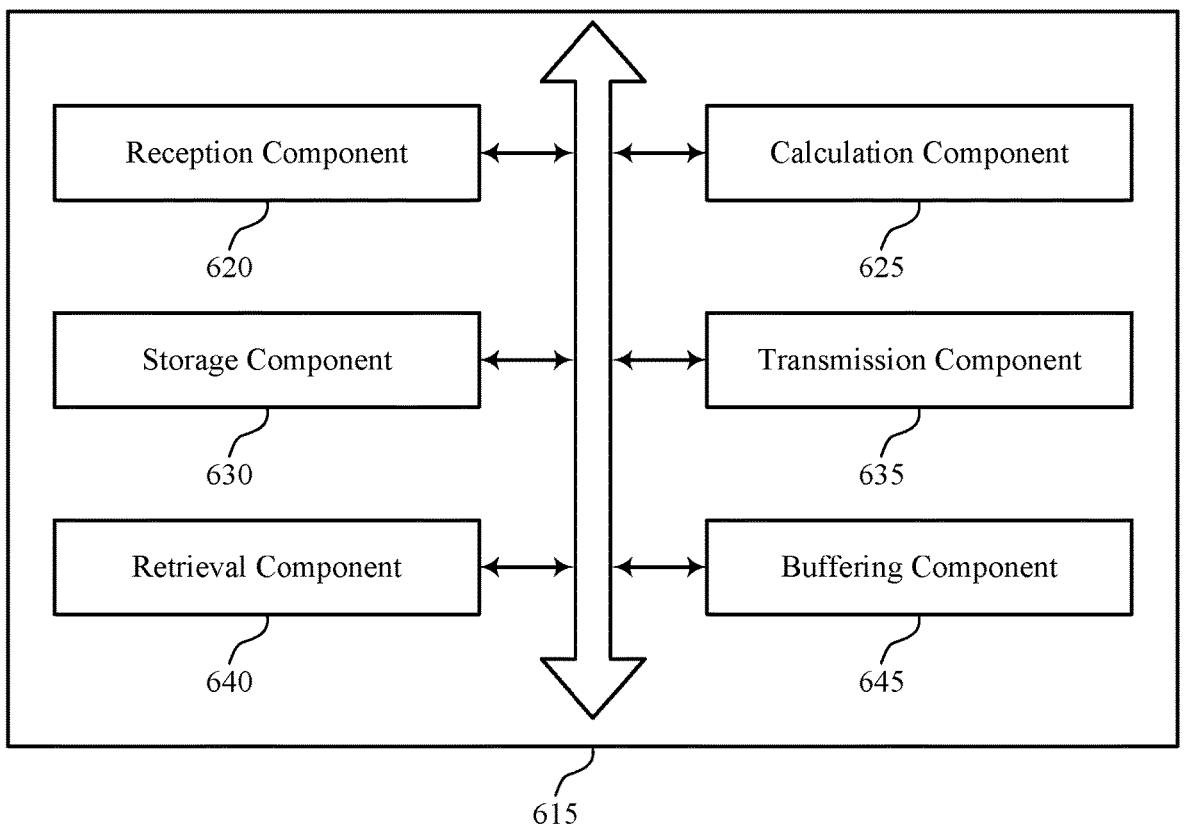

FIG. 6 shows a block diagram 600 of a predictive model calculator 615 that supports feature generation and storage in a multi-tenant environment in accordance with aspects of the present disclosure. The predictive model calculator 615 may be an example of aspects of a predictive model calculator 715 described with reference to FIGS. 4, 5, and 7. The predictive model calculator 615 may include reception component 620, calculation component 625, storage component 630, transmission component 635, retrieval component 640, and buffering component 645. Each of these modules may communicate, directly or indirectly, with one another (e.g., via one or more buses).

Reception component 620 may receive a data flow of events associated with a predictive model for a tenant, receive a data flow of events associated with a predictive model for a second tenant at the multi-tenant database server, and receive an indication of the feature definition. In some examples, calculating the one or more feature values is based on the indication of the feature definition. In some cases, the data flow of events associated with the predictive model may include a streaming data flow. In some cases, the received data flow is associated with a predictive model for each tenant of a set of tenants of a multi-tenant organization.

Calculation component 625 may calculate one or more feature values from the data flow of events based on a feature definition associated with the tenant, calculate scores for the predictive model based on the stored one or more feature values, calculate the one or more feature values from the data flow in a streaming workflow, calculate one or more feature values from the data flow of events based on a feature definition associated with the second tenant, calculate scores for the predictive model for the second tenant based on the stored one or more feature values associated with the second tenant, calculate the scores for the predictive model based on a predetermined time interval, and calculate the scores for the predictive model based on one or more rules associated with the feature definition associated with the tenant. In some cases, the feature definition may be associated with a set of tenants of the multi-tenant organization.

Storage component 630 may store the one or more feature values at the multi-tenant database server, store the one or more feature values associated with the second tenant at the multi-tenant database server, and store the one or more feature values at the multi-tenant database server. In some examples, calculating the scores for the predictive model is performed in a streaming workflow and are based on receiving the data flow of events associated with the predictive model for the tenant. In some cases, storing the one or more feature values at the multi-tenant database server may include assigning a key to the one or more feature values based on an identification of the tenant, an entity type of the tenant, an entity identification of the tenant, an identification of the feature definition associated with the tenant, or a combination thereof.

Transmission component 635 may transmit an indication of the calculated scores for the predictive model to a computing device.

Retrieval component 640 may retrieve the stored one or more feature values from the multi-tenant database server, where calculating the scores for the predictive model may be based on retrieving the stored one or more feature values and retrieve the stored one or more feature values from the multi-tenant database server may be based on a change in a number of feature values stored at the multi-tenant database server.

Buffering component 645 may buffer the data flow of events before receiving the data flow of events.

Figure 7:
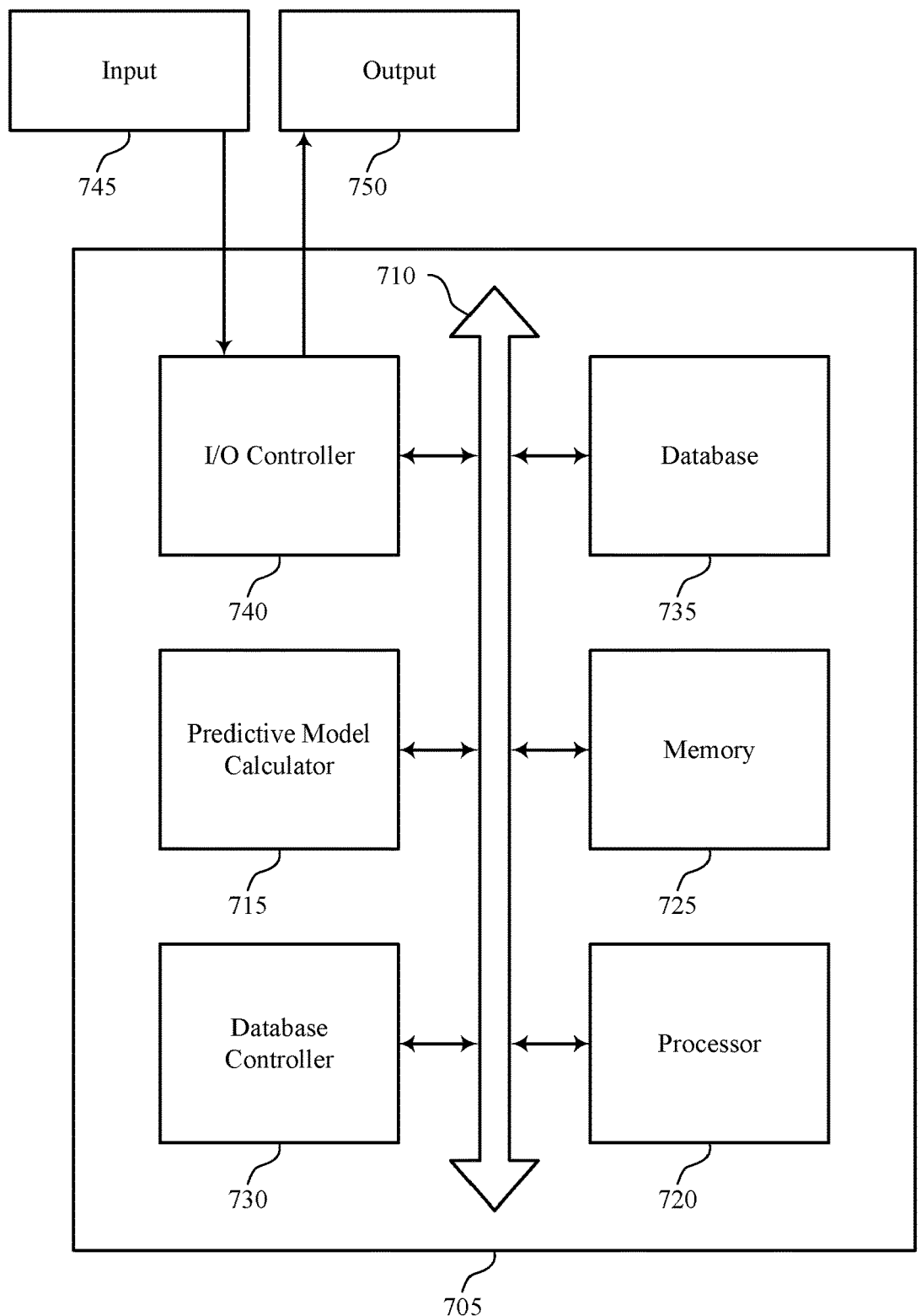
FIG. 7 illustrates a block diagram of a system including a multi-tenant database server that supports feature generation and storage in a multi-tenant environment in accordance with aspects of the present disclosure.

FIG. 7 shows a diagram of a system 700 including a device 705 that supports feature generation and storage in a multi-tenant environment in accordance with aspects of the present disclosure. Device 705 may be an example of or include the components of multi-tenant database server 210 as described above, e.g., with reference to FIG. 2. Device 705 may include components for bi-directional data communications including components for transmitting and receiving communications, including predictive model calculator 715, processor 720, memory 725, database controller 730, database 735, and I/O controller 740. These components may be in electronic communication via one or more buses (e.g., bus 710).

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting feature generation and storage in a multi-tenant environment).

Memory 725 may include random access memory (RAM) and read only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

Database controller 730 may manage data storage and processing in database 735. In some cases, a user may interact with database controller 730. In other cases, database controller 730 may operate automatically without user interaction.

Database 735 may be an example of a single database, a distributed database, multiple distributed databases, or an emergency backup database.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

Figure 8:
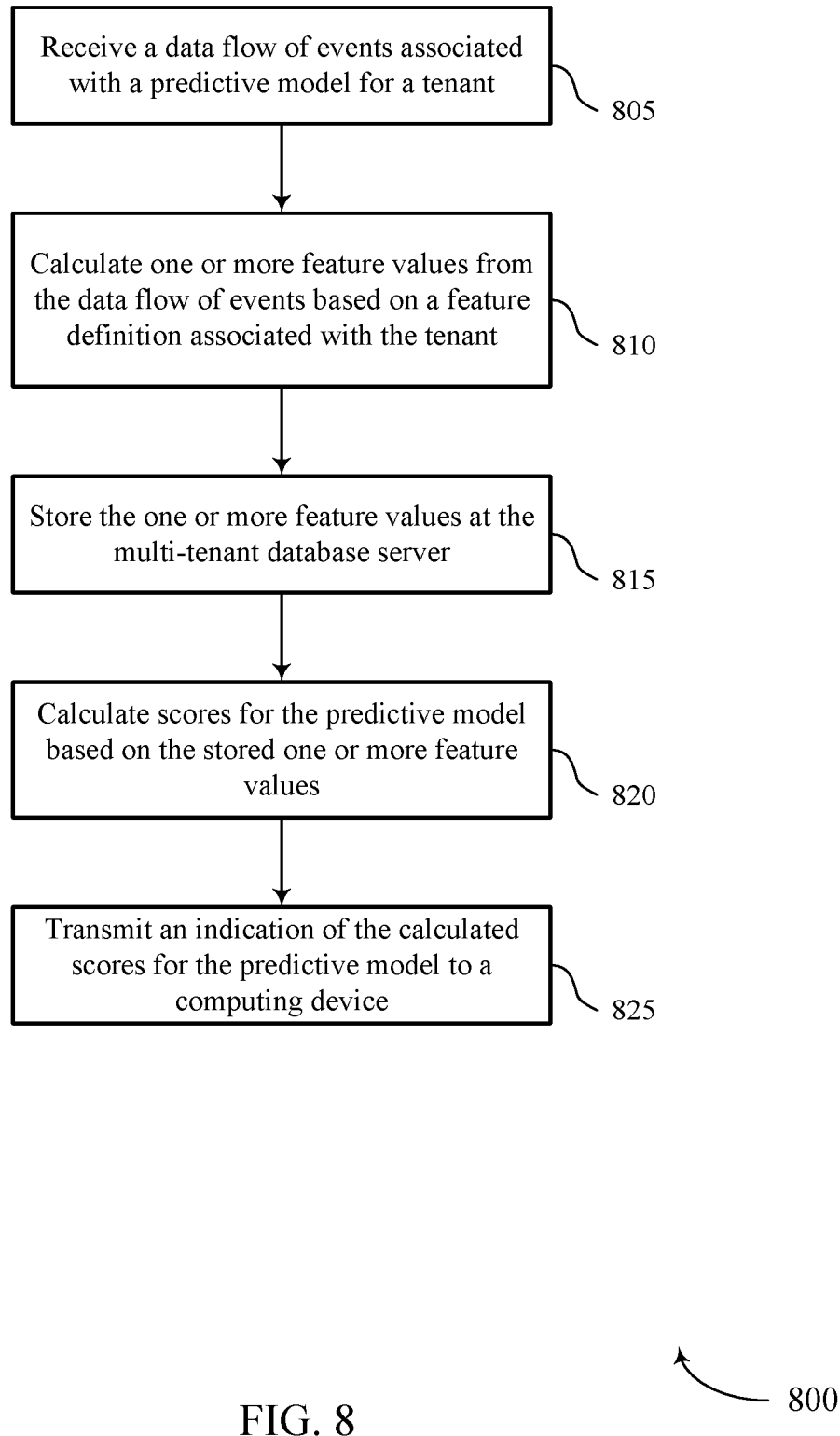
FIGS. 8 through 11 illustrate methods for s feature generation and storage in a multi-tenant environment in accordance with aspects of the present disclosure.

FIG. 8 shows a flowchart illustrating a method 800 for feature generation and storage in a multi-tenant environment in accordance with aspects of the present disclosure. The operations of method 800 may be implemented by a multi-tenant database server or its components as described herein.

For example, the operations of method 800 may be performed by a predictive model calculator as described with reference to FIGS. 5 through 7. In some examples, a multi-tenant database server may execute a set of codes to control the functional elements of the device to perform the functions described below. Additionally or alternatively, the multi-tenant database server may perform aspects of the functions described below using special-purpose hardware.

At 805 the multi-tenant database server may receive a data flow of events associated with a predictive model for a tenant. The operations of 805 may be performed according to the methods described herein. In certain examples, aspects of the operations of 805 may be performed by a reception component as described with reference to FIGS. 5 through 7.

At 810 the multi-tenant database server may calculate one or more feature values from the data flow of events based at least in part on a feature definition associated with the tenant. The operations of 810 may be performed according to the methods described herein. In certain examples, aspects of the operations of 810 may be performed by a calculation component as described with reference to FIGS. 5 through 7.

At 815 the multi-tenant database server may store the one or more feature values at the multi-tenant database server. The operations of 815 may be performed according to the methods described herein. In certain examples, aspects of the operations of 815 may be performed by a storage component as described with reference to FIGS. 5 through 7.

At 820 the multi-tenant database server may calculate scores for the predictive model based at least in part on the stored one or more feature values. The operations of 820 may be performed according to the methods described herein. In certain examples, aspects of the operations of 820 may be performed by a calculation component as described with reference to FIGS. 5 through 7.

At 825 the multi-tenant database server may transmit an indication of the calculated scores for the predictive model to a computing device. The operations of 825 may be performed according to the methods described herein. In certain examples, aspects of the operations of 825 may be performed by a transmission component as described with reference to FIGS. 5 through 7.

Figure 9:
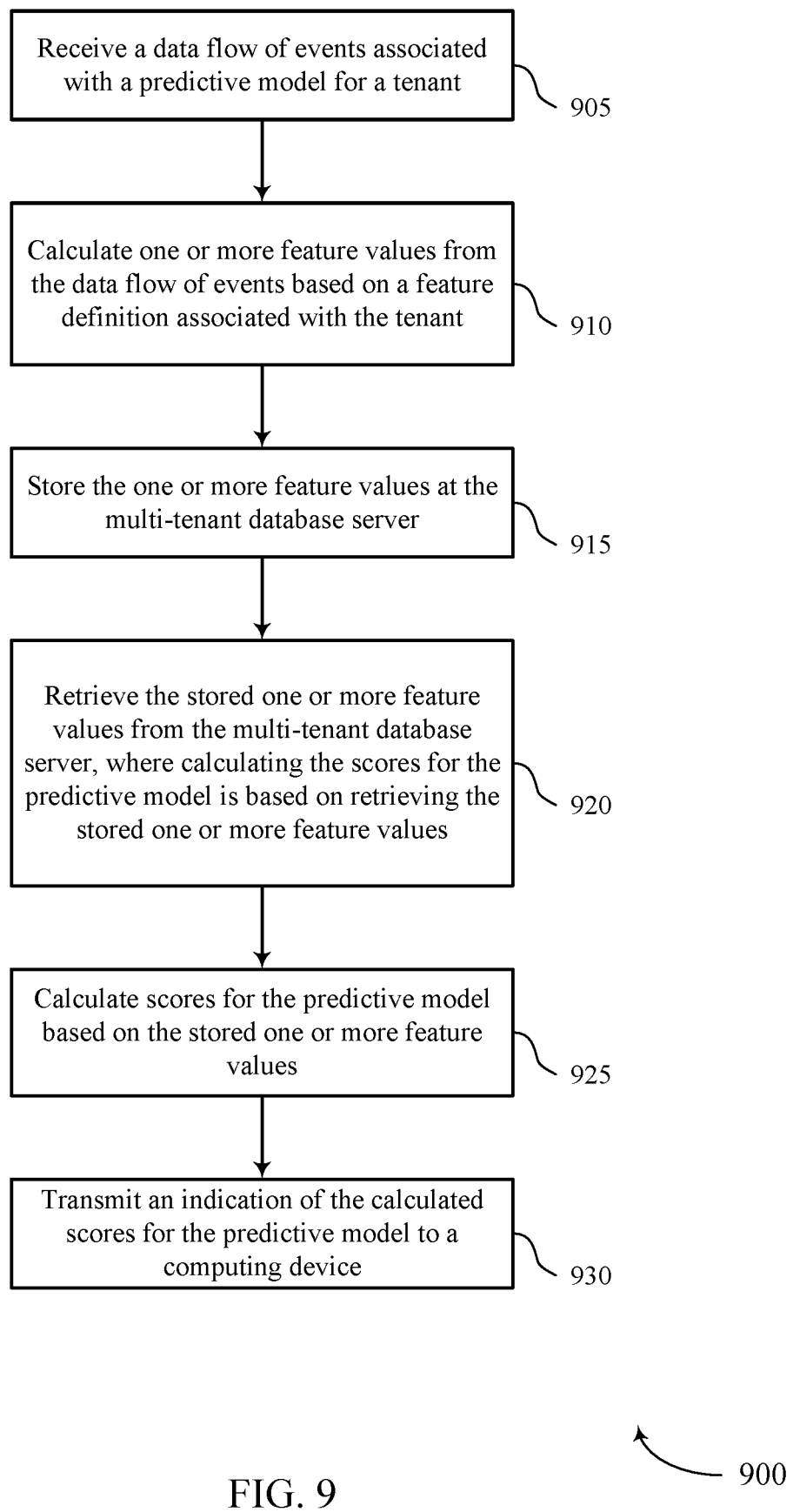

FIG. 9 shows a flowchart illustrating a method 900 for feature generation and storage in a multi-tenant environment in accordance with aspects of the present disclosure. The operations of method 900 may be implemented by a multi-tenant database server or its components as described herein. For example, the operations of method 900 may be performed by a predictive model calculator as described with reference to FIGS. 5 through 7. In some examples, a multi-tenant database server may execute a set of codes to control the functional elements of the device to perform the functions described below. Additionally or alternatively, the multi-tenant database server may perform aspects of the functions described below using special-purpose hardware.

At 905 the multi-tenant database server may receive a data flow of events associated with a predictive model for a tenant. The operations of 905 may be performed according to the methods described herein. In certain examples, aspects of the operations of 905 may be performed by a reception component as described with reference to FIGS. 5 through 7.

At 910 the multi-tenant database server may calculate one or more feature values from the data flow of events based at least in part on a feature definition associated with the tenant. The operations of 910 may be performed according to the methods described herein. In certain examples, aspects of the operations of 910 may be performed by a calculation component as described with reference to FIGS. 5 through 7.

At 915 the multi-tenant database server may store the one or more feature values at the multi-tenant database server. The operations of 915 may be performed according to the methods described herein. In certain examples, aspects of the operations of 915 may be performed by a storage component as described with reference to FIGS. 5 through 7.

At 920 the multi-tenant database server may retrieve the stored one or more feature values from the multi-tenant database server, wherein calculating the scores for the predictive model is based at least in part on retrieving the stored one or more feature values. The operations of 920 may be performed according to the methods described herein. In certain examples, aspects of the operations of 920 may be performed by a retrieval component as described with reference to FIGS. 5 through 7.

At 925 the multi-tenant database server may calculate scores for the predictive model based at least in part on the stored one or more feature values. The operations of 925 may be performed according to the methods described herein. In certain examples, aspects of the operations of 925 may be performed by a calculation component as described with reference to FIGS. 5 through 7.

At 930 the multi-tenant database server may transmit an indication of the calculated scores for the predictive model to a computing device. The operations of 930 may be performed according to the methods described herein. In certain examples, aspects of the operations of 930 may be performed by a transmission component as described with reference to FIGS. 5 through 7.

Figure 10:
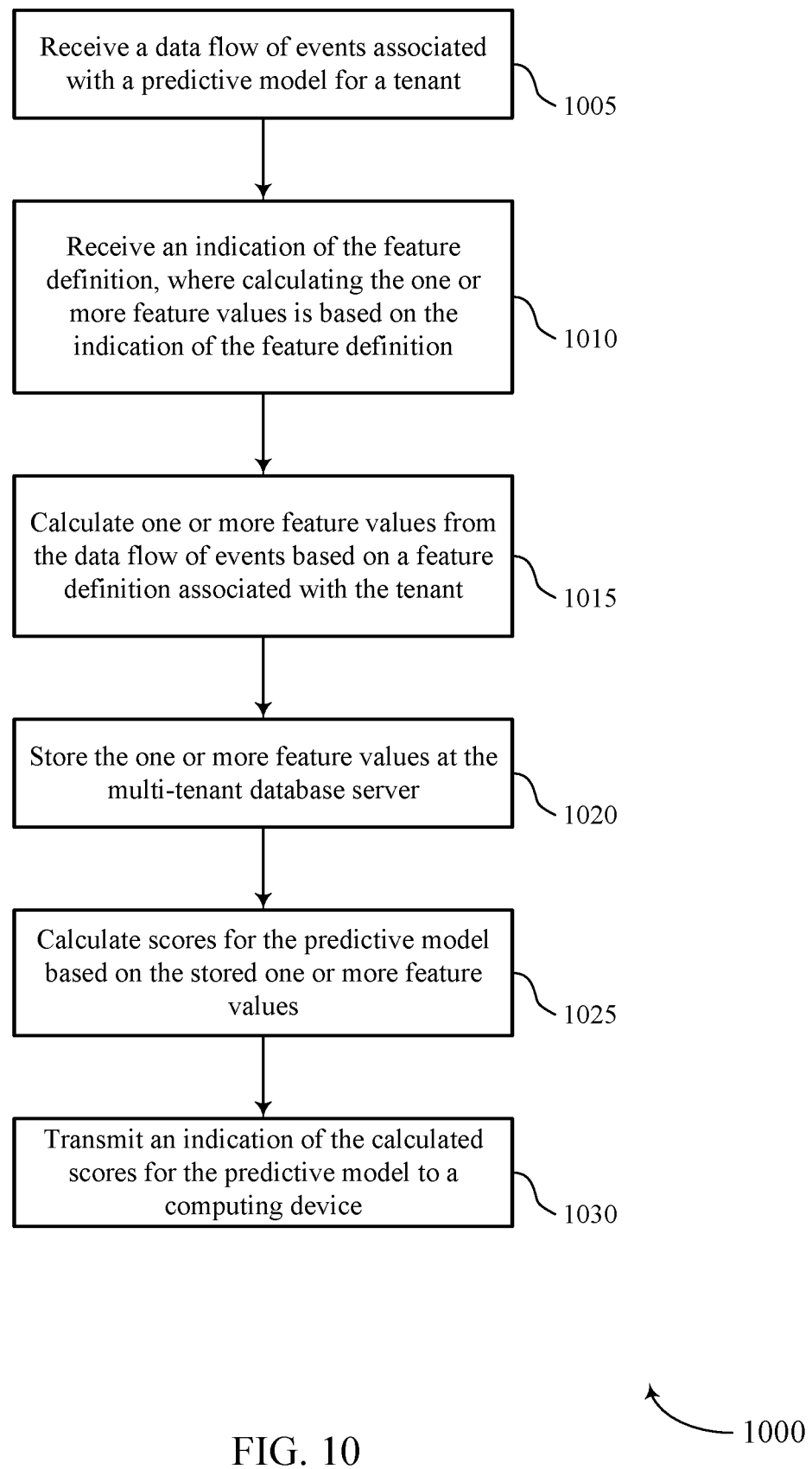

FIG. 10 shows a flowchart illustrating a method 1000 for feature generation and storage in a multi-tenant environment in accordance with aspects of the present disclosure. The operations of method 1000 may be implemented by a multi-tenant database server or its components as described herein. For example, the operations of method 1000 may be performed by a predictive model calculator as described with reference to FIGS. 5 through 7. In some examples, a multi-tenant database server may execute a set of codes to control the functional elements of the device to perform the functions described below. Additionally or alternatively, the multi-tenant database server may perform aspects of the functions described below using special-purpose hardware.

At 1005 the multi-tenant database server may receive a data flow of events associated with a predictive model for a tenant. The operations of 1005 may be performed according to the methods described herein. In certain examples, aspects of the operations of 1005 may be performed by a reception component as described with reference to FIGS. 5 through 7.

At 1010 the multi-tenant database server may receive an indication of the feature definition, wherein calculating the one or more feature values is based at least in part on the indication of the feature definition. The operations of 1010 may be performed according to the methods described herein. In certain examples, aspects of the operations of 1010 may be performed by a reception component as described with reference to FIGS. 5 through 7.

At 1015 the multi-tenant database server may calculate one or more feature values from the data flow of events based at least in part on a feature definition associated with the tenant. The operations of 1015 may be performed according to the methods described herein. In certain examples, aspects of the operations of 1015 may be performed by a calculation component as described with reference to FIGS. 5 through 7.

At 1020 the multi-tenant database server may store the one or more feature values at the multi-tenant database server. The operations of 1020 may be performed according to the methods described herein. In certain examples, aspects of the operations of 1020 may be performed by a storage component as described with reference to FIGS. 5 through 7.

At 1025 the multi-tenant database server may calculate scores for the predictive model based at least in part on the stored one or more feature values. The operations of 1025 may be performed according to the methods described herein. In certain examples, aspects of the operations of 1025 may be performed by a calculation component as described with reference to FIGS. 5 through 7.

At 1030 the multi-tenant database server may transmit an indication of the calculated scores for the predictive model to a computing device. The operations of 1030 may be performed according to the methods described herein. In certain examples, aspects of the operations of 1030 may be performed by a transmission component as described with reference to FIGS. 5 through 7.

Figure 11:
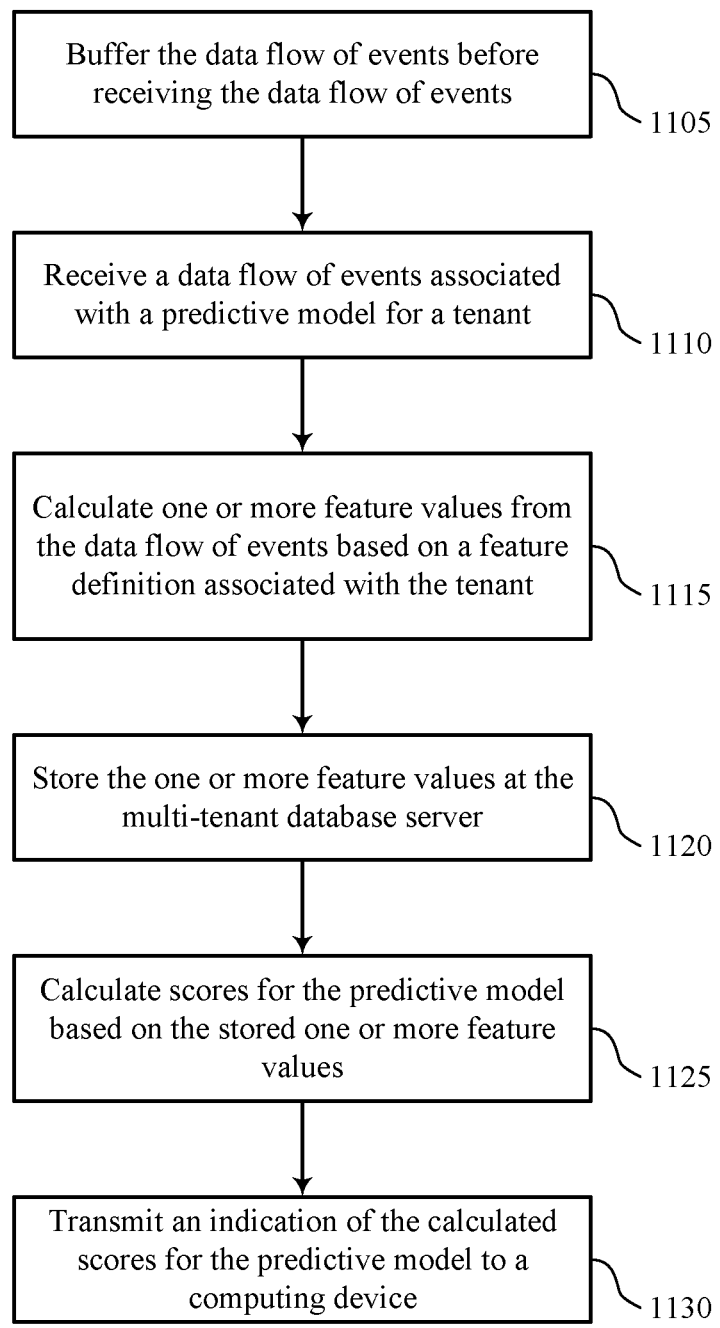

FIG. 11 shows a flowchart illustrating a method 1100 for feature generation and storage in a multi-tenant environment in accordance with aspects of the present disclosure. The operations of method 1100 may be implemented by a multi-tenant database server or its components as described herein. For example, the operations of method 1100 may be performed by a predictive model calculator as described with reference to FIGS. 5 through 7. In some examples, a multi-tenant database server may execute a set of codes to control the functional elements of the device to perform the functions described below. Additionally or alternatively, the multi-tenant database server may perform aspects of the functions described below using special-purpose hardware.

At 1105 the multi-tenant database server may buffer the data flow of events before receiving the data flow of events. The operations of 1105 may be performed according to the methods described herein. In certain examples, aspects of the operations of 1105 may be performed by a buffering component as described with reference to FIGS. 5 through 7.

At 1110 the multi-tenant database server may receive a data flow of events associated with a predictive model for a tenant. The operations of 1110 may be performed according to the methods described herein. In certain examples, aspects of the operations of 1110 may be performed by a reception component as described with reference to FIGS. 5 through 7.

At 1115 the multi-tenant database server may calculate one or more feature values from the data flow of events based at least in part on a feature definition associated with the tenant. The operations of 1115 may be performed according to the methods described herein. In certain examples, aspects of the operations of 1115 may be performed by a calculation component as described with reference to FIGS. 5 through 7.

At 1120 the multi-tenant database server may store the one or more feature values at the multi-tenant database server. The operations of 1120 may be performed according to the methods described herein. In certain examples, aspects of the operations of 1120 may be performed by a storage component as described with reference to FIGS. 5 through 7.

At 1125 the multi-tenant database server may calculate scores for the predictive model based at least in part on the stored one or more feature values. The operations of 1125 may be performed according to the methods described herein. In certain examples, aspects of the operations of 1125 may be performed by a calculation component as described with reference to FIGS. 5 through 7.

At 1130 the multi-tenant database server may transmit an indication of the calculated scores for the predictive model to a computing device. The operations of 1130 may be performed according to the methods described herein. In certain examples, aspects of the operations of 1130 may be performed by a transmission component as described with reference to FIGS. 5 through 7.

A method of data processing at a multi-tenant database server is described. The method may include receiving a data flow of events associated with a predictive model for a tenant, calculating one or more feature values from the data flow of events based at least in part on a feature definition associated with the tenant, storing the one or more feature values at the multi-tenant database server, calculating scores for the predictive model based at least in part on the stored one or more feature values, and transmitting an indication of the calculated scores for the predictive model to a computing device.

Another apparatus for data processing at a multi-tenant database server is described. The apparatus may include a processor, memory in electronic communication with the processor, and instructions stored in the memory. The instructions may be operable to cause the processor to receive a data flow of events associated with a predictive model for a tenant, calculate one or more feature values from the data flow of events based at least in part on a feature definition associated with the tenant, store the one or more feature values at the multi-tenant database server, calculate scores for the predictive model based at least in part on the stored one or more feature values, and transmit an indication of the calculated scores for the predictive model to a computing device.

A non-transitory computer-readable medium for data processing at a multi-tenant database server is described. The non-transitory computer-readable medium may include instructions operable to cause a processor to receive a data flow of events associated with a predictive model for a tenant, calculate one or more feature values from the data flow of events based at least in part on a feature definition associated with the tenant, store the one or more feature values at the multi-tenant database server, calculate scores for the predictive model based at least in part on the stored one or more feature values, and transmit an indication of the calculated scores for the predictive model to a computing device.

Some examples of the method, apparatus, and non-transitory computer-readable medium described above may further include processes, features, means, or instructions for calculating the one or more feature values from the data flow in a streaming workflow.

In some examples of the method, apparatus, and non-transitory computer-readable medium described above, the data flow of events associated with the predictive model may include a streaming data flow.

Some examples of the method, apparatus, and non-transitory computer-readable medium described above may further include processes, features, means, or instructions for receiving a data flow of events associated with a predictive model for a second tenant at the multi-tenant database server. Some examples of the method, apparatus, and non-transitory computer-readable medium described above may further include processes, features, means, or instructions for calculating one or more feature values from the data flow of events based at least in part on a feature definition associated with the second tenant. Some examples of the method, apparatus, and non-transitory computer-readable medium described above may further include processes, features, means, or instructions for storing the one or more feature values associated with the second tenant at the multi-tenant database server. Some examples of the method, apparatus, and non-transitory computer-readable medium described above may further include processes, features, means, or instructions for calculating scores for the predictive model for the second tenant based at least in part on the stored one or more feature values associated with the second tenant.

Some examples of the method, apparatus, and non-transitory computer-readable medium described above may further include processes, features, means, or instructions for retrieving the stored one or more feature values from the multi-tenant database server, wherein calculating the scores for the predictive model may be based at least in part on retrieving the stored one or more feature values.

Some examples of the method, apparatus, and non-transitory computer-readable medium described above may further include processes, features, means, or instructions for retrieving the stored one or more feature values from the multi-tenant database server may be based at least in part on a change in a number of feature values stored at the multi-tenant database server.

Some examples of the method, apparatus, and non-transitory computer-readable medium described above may further include processes, features, means, or instructions for storing the one or more feature values at the multi-tenant database server and calculating the scores for the predictive model may be performed in a streaming workflow and may be based at least in part on receiving the data flow of events associated with the predictive model for the tenant.

Some examples of the method, apparatus, and non-transitory computer-readable medium described above may further include processes, features, means, or instructions for receiving an indication of the feature definition, wherein calculating the one or more feature values may be based at least in part on the indication of the feature definition.

Some examples of the method, apparatus, and non-transitory computer-readable medium described above may further include processes, features, means, or instructions for buffering the data flow of events before receiving the data flow of events.

In some examples of the method, apparatus, and non-transitory computer-readable medium described above, storing the one or more feature values at the multi-tenant database server may include assigning a key to the one or more feature values based at least in part on an identification of the tenant, an entity type of the tenant, an entity identification of the tenant, an identification of the feature definition associated with the tenant, or a combination thereof.

In some examples of the method, apparatus, and non-transitory computer-readable medium described above, the received data flow may be associated with a predictive model for each tenant of a plurality of tenants of a multi-tenant organization.

In some examples of the method, apparatus, and non-transitory computer-readable medium described above, the feature definition may be associated with a plurality of tenants of the multi-tenant organization.

Some examples of the method, apparatus, and non-transitory computer-readable medium described above may further include processes, features, means, or instructions for calculating the scores for the predictive model, which may be based at least in part on a predetermined time interval.

Some examples of the method, apparatus, and non-transitory computer-readable medium described above may further include processes, features, means, or instructions for calculating the scores for the predictive model, which may be based at least in part on one or more rules associated with the feature definition associated with the tenant.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a multi-tenant database server, comprising:
   receiving a data flow of events associated with a predictive model for a tenant;
   calculating one or more feature values from the data flow of events based at least in part on a feature definition indicating one or more variables associated with the data flow of events;
   storing the one or more feature values at the multi-tenant database server;
   calculating scores for the predictive model using the stored one or more feature values associated with the data flow of events; and
   transmitting the calculated scores for the predictive model to a computing device.

2. The method of claim 1, further comprising:
   calculating the one or more feature values from the data flow in a streaming workflow.

3. The method of claim 1, wherein the data flow of events associated with the predictive model comprises a streaming data flow.

4. The method of claim 1, further comprising:
   receiving a data flow of events associated with a predictive model for a second tenant at the multi-tenant database server;
   calculating one or more feature values from the data flow of events based at least in part on a feature definition indicating one or more variables associated with the data flow of events associated with the predictive model for the second tenant;
   storing the one or more feature values associated with the second tenant at the multi-tenant database server; and
   calculating scores for the predictive model for the second tenant using the stored one or more feature values associated with the second tenant.

5. The method of claim 1, further comprising:
   retrieving the stored one or more feature values from the multi-tenant database server, wherein calculating the scores for the predictive model associated with the tenant is based at least in part on retrieving the stored one or more feature values.

6. The method of claim 5, wherein retrieving the stored one or more feature values from the multi-tenant database server is based at least in part on a change in a number of feature values stored at the multi-tenant database server.

7. The method of claim 1, wherein storing the one or more feature values at the multi-tenant database server and calculating the scores for the predictive model are performed in a streaming workflow and are based at least in part on receiving the data flow of events associated with the predictive model for the tenant.

8. The method of claim 1, further comprising:
   receiving the feature definition associated with the tenant, wherein calculating the one or more feature values is based at least in part on the feature definition.

9. The method of claim 1, further comprising:
   buffering the data flow of events before receiving the data flow of events.

10. The method of claim 1, wherein storing the one or more feature values at the multi-tenant database server comprises:
    assigning a key to the one or more feature values based at least in part on an identification of the tenant, an entity type of the tenant, an entity identification of the tenant, an identification of the feature definition associated with the tenant, or a combination thereof.

11. The method of claim 1, wherein the received data flow is associated with a predictive model for each tenant of a plurality of tenants of a multi-tenant organization.

12. The method of claim 1, wherein the feature definition is associated with a plurality of tenants of the multi-tenant organization.

13. The method of claim 1, wherein calculating the scores for the predictive model associated with the tenant is based at least in part on a predetermined time interval.

14. The method of claim 1, wherein calculating the scores for the predictive model is based at least in part on one or more rules associated with the feature definition associated with the tenant.

15. An apparatus for data processing at a multi-tenant database server, comprising:
   a processor;
   memory in electronic communication with the processor; and
   instructions stored in the memory and executable by the processor to cause the apparatus to:
   receive a data flow of events associated with a predictive model for a tenant;
   calculate one or more feature values from the data flow of events based at least in part on a feature definition indicating one or more variables associated with the data flow of events;
   store the one or more feature values at the multi-tenant database server;
   calculate scores for the predictive model using the stored one or more feature values associated with the data flow of events; and
   transmit the calculated scores for the predictive model to a computing device.

16. The apparatus of claim 15, wherein the instructions are further executable by the processor to cause the apparatus to:
   calculate the one or more feature values from the data flow in a streaming workflow.

17. The apparatus of claim 15, wherein the instructions are further executable by the processor to cause the apparatus to:
   retrieve the stored one or more feature values from the multi-tenant database server, wherein calculating the scores for the predictive model is based at least in part on retrieving the stored one or more feature values.

18. A non-transitory computer-readable medium storing code for data processing at a multi-tenant database server, the code comprising instructions executable by a processor to:
   receive a data flow of events associated with a predictive model for a tenant;
   calculate one or more feature values from the data flow of events based at least in part on a feature definition indicating one or more variables associated with the data flow of events;
   store the one or more feature values at the multi-tenant database server;
   calculate scores for the predictive model based at least in part on using the stored one or more feature values associated with the data flow of events; and
   transmit the calculated scores for the predictive model to a computing device.

19. The non-transitory computer-readable medium of claim 18, wherein the instructions are further executable by the processor to:
   calculate the one or more feature values from the data flow in a streaming workflow.

20. The non-transitory computer-readable medium of claim 18, wherein the instructions are further executable by the processor to:
   buffer the data flow of events before receiving the data flow of events.

* * * * *